H. Thomas,
Casting Car Wheels.
№ 980. Patented Oct. 13, 1838.
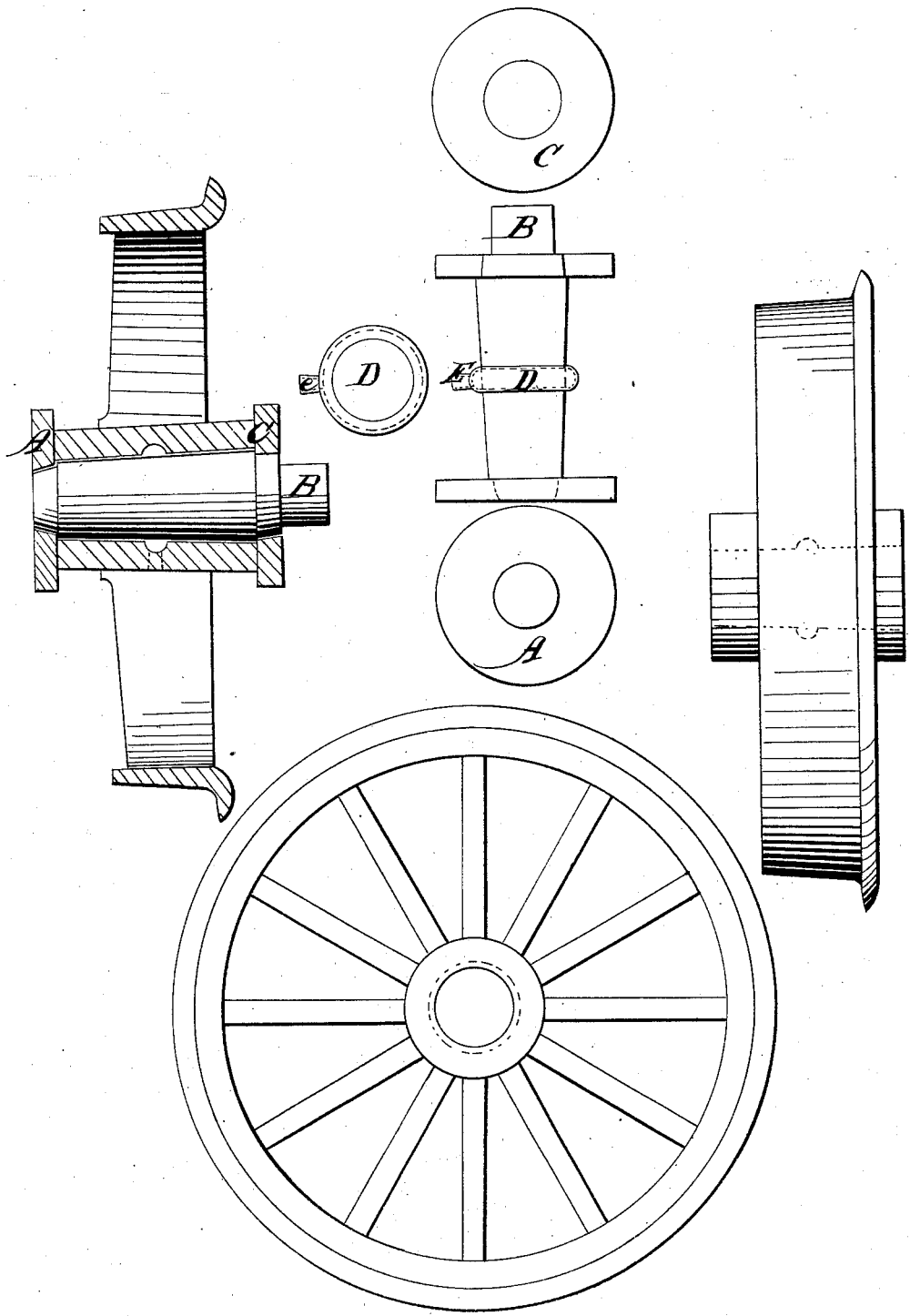

UNITED STATES PATENT OFFICE.

HOPKIN THOMAS, OF BEAVER MEADOW, PENNSYLVANIA.

IMPROVEMENT IN THE MODE OF HARDENING OR CHILLING THE HUBS OF CAR AND OTHER WHEELS.

Specification forming part of Letters Patent No. 980, dated October 13, 1838.

*To all whom it may concern:*

Be it known that I, HOPKIN THOMAS, of Beaver Meadow, in the county of Northampton and State of Pennsylvania, have invented a new and improved mode of chilling or hardening the ends and inner surface of the hubs or naves of railroad-car wheels, wagon-boxes, or any other cylindrical bearings made of cast-iron; and I do hereby declare that the following is a full and exact description, a drawing of which is herewith communicated.

The nature of my invention consists in placing a conical pin of wrought or cast iron in the center of the aperture left in the sand where the core or composition of sand is usually placed to form a hollow cylinder; also, a plate or washer at the upper and lower end of the hub or cylinder, which hardens the metal coming in contact with them.

To enable others skilled in the art to make use of my invention, I will proceed to describe its construction and operation.

I construct my patterns in any of the known forms, putting a core-print on the lower end corresponding with the hole in the center of the iron washer A, to be used as a chill for the surface of the lower end. The chill or washer A is first laid on the face-board, the pattern then laid on, with the core-print above described inserted in the plate, the pattern being provided with a print on the upper side corresponding with the head of the iron pin B and the washer C, after the usual process of molding, the iron pin B having been previously warmed and lightly oiled. The collar D placed on its center, it is then inserted in the washer A, lying on the face-board. The washer or chill C is then placed on the upper or large end of the chill-pin B, and the flask closed. The collar D is made of tin or sheet-iron, and is designed to leave an aperture or groove around the center of the hub, wagon-box, or cylindrical bearing, to form a passage for the oil or any anti-attrition substance which may be used to prevent friction. The tubes E are attached to the center of collar D, setting at right angles with the center of the pin B. The object of this tube is to leave a hole in the casting, through which the oil may be poured to the groove made by the collar D. As soon as the metal has changed from a state of fusion to solidity the pin B must be withdrawn and water poured into the cavity left by it, and continued to be poured in at intervals, that the hub or nave may be kept at the same temperature as the outer periphery of the wheel or cylinder, to prevent the arms or outer periphery from cracking when cooling. This also produces a hardness of surface not liable to wear out.

What I claim as my invention in the above specification is—

1. The construction and application of a chilled surface on the inside and ends of the hubs or naves of cast-iron railroad car-wheels, wagon-boxes, or other cylindrical bearings, made by means of the combined chills, as described in the above specification.

2. The construction and application of a groove made as above described within such chilled hub or nave, wagon-box, or other cylindrical bearing, for the reception of any lubricating substance.

HOPKIN THOMAS.

Witnesses:
    I. W. HALL,
    A. H. VANCLEVE.